United States Patent [19]

O'Connor

[11] 4,241,121
[45] Dec. 23, 1980

[54] COMBINED SHIELD AND CORE WRAP FOR TELECOMMUNICATION CABLES AND THE LIKE

[75] Inventor: Lawrence O'Connor, Winnipeg, Canada

[73] Assignee: Kable Tapes Ltd., Winnipeg, Canada

[21] Appl. No.: 19,468

[22] Filed: Mar. 12, 1979

[30] Foreign Application Priority Data

Mar. 16, 1978 [GB] United Kingdom ............... 10466/78

[51] Int. Cl.³ .......................... H01B 3/00; B32B 15/08
[52] U.S. Cl. .......................................... 428/77; 428/78; 428/121; 428/124; 428/458; 428/463; 428/523; 428/906
[58] Field of Search .................... 428/77, 78, 121, 124, 428/123, 130, 295, 458, 461, 463, 483, 523, 906

[56] References Cited

U.S. PATENT DOCUMENTS

| | | | |
|---|---|---|---|
| 3,086,216 | 4/1963 | Brooks et al. | 428/124 X |
| 3,589,975 | 6/1971 | Andrews et al. | 428/458 |
| 3,661,693 | 5/1972 | Pierson | 428/123 |
| 3,826,441 | 7/1974 | Miles | 156/277 X |
| 3,826,862 | 7/1974 | Chiba et al. | 428/463 X |
| 3,949,134 | 4/1976 | Willdorf | 428/483 X |
| 4,028,475 | 6/1977 | Willdorf | 428/458 X |
| 4,156,054 | 5/1979 | Gurewitsch | 428/77 |
| 4,158,718 | 6/1979 | Kehl et al. | 428/461 |

Primary Examiner—Harold Ansher
Attorney, Agent, or Firm—Stanley G. Ade

[57] ABSTRACT

A multiple layer of plastic films is laminated in tape form in combination with a layer of aluminum foil so as to enclose the aluminum in a protective layer of plastic, the remaining layers being chosen to provide dielectric and moisture protection for the cable, and incorporating a greater width of plastic combinations than aluminum, such extra width being optionally folded over upon the section containing the aluminum, to provide contiguous faces having thermoplastic properties which will be sealed by the heat of extrusion of the cable jacket during the manufacturing process.

24 Claims, 4 Drawing Figures

U.S. Patent     Dec. 23, 1980     4,241,121
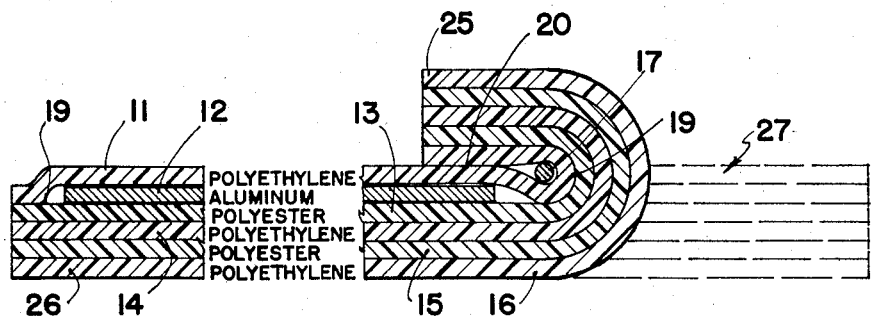
FIG. 1
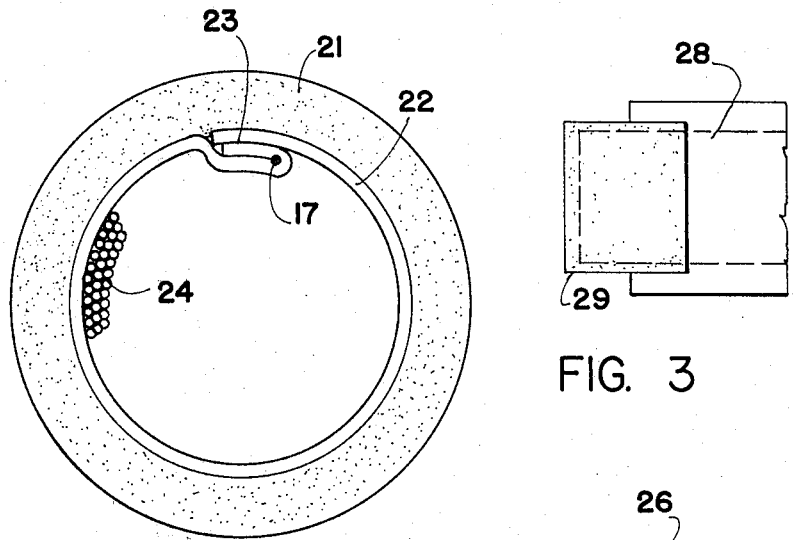
FIG. 2
FIG. 3
FIG. 4

COMBINED SHIELD AND CORE WRAP FOR TELECOMMUNICATION CABLES AND THE LIKE

BACKGROUND OF THE INVENTION

This invention relates to new and useful improvements in the construction of core wraps and shield combinations for telecommunication cables and the like.

Such cables consist of a plurality of pairs of insulated conductors, grouped in a circular formation, and which are wrapped, generally longitudinally, with a core wrap which may be of any suitable plastic or combination of plastic materials which will provide physical, dielectric and thermal protection to the conductors, and/or any combination of the above. The core wrap is lapped over upon itself and is usually secured in place with a helically applied binder.

Over the core wrap, again generally applied longitudinally, is a shield of metallic foil, generally aluminum, which is also lapped over upon itself, and is usually faced on one or both sides with a bonded thermoplastic film which protects the metallic foil from corrosion. This foil laminate provides a protective moisture barrier for the conductors, shields them from external electrical forces, and the thermoplastic film seals to itself at the overlap during the jacket extrusion process, thus improving the moisture barrier.

However, all such cables are susceptible to faults occurring in manufacturing, due to unavoidable weaknesses in the materials and methods used in manufacture, in applying the core wrap, the metallic shield and the outer jacket.

Depending upon the material used, certain plastic films may exhibit excellent dielectric, thermal, and physical strength properties, and others may have excellent bonding and moisture resistant properties or characteristics. Therefore, to produce a cable having all of the above desired operating qualities, it has been found necessary to incorporate multiple laminated core wrap assemblies composed of plastic films having differing physical and electrical properties, to ensure that the core bundle is isolated from the shield. It is further necessary to enclose the aluminum or other metallic foil shield on both sides and edges with a plastic film to prevent corrosion of the metal in the event of moisture ingress through the exterior jacket as a result of mechanical or other damage.

Current cable manufacturing processes generally specify a laminated plastic core wrap, held in place by a helically applied binder, followed by the plastic covered shield, which is formed into a circular or cylindrical shape closely surrounding the core and core wrap, immediately ahead of the jacket extrusion operation. This multiplicity of protective layers creates complications in production, and the presence of binders accentuates the possibility of moisture travel along the cable by capillary action between the core wrap and the shield, which can change the characteristics of the cable and ultimately render it unfit for use.

Furthermore, every different layer of protective material applied to the cable requires additional machinery, and supervision to ensure continual production of quality products, and added maintenance, as the forming portions of the core wrap and shield are critical parts of the cable making process, and must be designed and maintained to very close tolerances.

In addition, present practice provides core wrap and foil shield in the form of spirally wound tapes in the desired width to circumferentially surround the core bundle, and in lengths which can be physically handled without "telescoping". This requires splicing of such materials as a roll of tape or foil comes to an end, and as the manufacture of cable is a continuous process consisting of a simultaneous taping and jacketing which when once started cannot be stopped without ruining the cable, splices must be made to the end of a new roll by the accumulator or "flying splice" method without stopping the cable operation. This can be a critical operation with the possibility of many mishaps occurring within the short time available to make the splice. Hence it is desirable to provide core wrap tapes and foil tapes in as long lengths as possible, or in other words, as great a diameter roll as can be handled without damage.

Still further, if the shield is protected with a layer of thermoplastic material, for corrosion resistance, such thermoplastic layer may bond to the jacket of the cable during the jacket extrusion process, causing difficulties in some cases in stripping the jacket. This may be ameliorated by providing a protective layer on the foil shield which does not bond to the jacket material, but such a construction fails to provide a sealing of the shield protective material to itself, which may contribute to cable failure.

SUMMARY OF THE INVENTION

In accordance with the invention there is provided a combination core wrap and shield for use in the manufacture of telecommunication cables and the like which include a core and an outer extruded plastic cable jacket; comprising in combination a flexible elongated shield of metallic foil having a pair of longitudinal edges, at least one outer flexible plastic film bonded to one side of said shield and also having longitudinal edges, the longitudinal edges of said outer plastic film extending beyond the longitudinal edges of said shield, at least one inner flexible plastic film bonded to the other side of said shield and also having longitudinally extending edges, the longitudinal extending edges of said inner plastic film also extending beyond the longitudinal extending edges of said shield, the portions of said inner and outer plastic films extending beyond the longitudinally extending edges of said shield, being bonded together to envelope said shield thus forming a corrosion and moisture-proof enclosure for said shield.

It is an advantage of this invention to produce a multiple laminated core wrap and shield construction of the character herewithin described, in order to overcome the deficiencies noted above in cable construction and operation, and to provide the means to secure the desired properties in the cable in an efficient and economical manner well suited to the purpose for which it has been designed.

Another advantage of this invention is to provide a device of the character herewithin described in which a combination core wrap and shield may be fabricated into the cable as a single step process thereby eliminating at least one production operation and reducing the varieties of core wrap and shield materials required to be carried in inventory by the cable manufacturer.

A still further advantage of this invention is to eliminate the necessity of a helical binder over the core wrap, to hold it in position until the shield is applied, such elimination providing an overall smaller diameter cable, and superior sealing of the combination core wrap and shield assembly.

A yet further advantage of the invention is to provide a laminated combination core wrap and shield assembly, which by combining the properties of various plastic films, may provide adequate dielectric strength and other physical properties to meet varied requirements of the manufacturer and user.

A yet further advantage of this invention is to eliminate the necessity for flooding the core wrap, after it has been installed over the core bundle, with heated liquid petroleum jelly or the like, as a means of preventing moisture travel along the cable between core wrap and shield, as the construction of this combined core wrap and shield will accomplish the above described desired means without the flooding or overfill operation, thus eliminating another station on the cable assembly line, and reducing the amount and cost of such filling compound and at the same time, eliminating water travel between core wrap and shield.

A still further advantage is to provide a core wrap and shield which may include a laminated plastic width greater than that of the metallic foil shield on one of the edges of the core wrap, such edge being preferably but not necessarily folded back over the main body of the tape, and supplied to the cable manufacturer in either state, and optionally sealed, which, by choice of the properties of the plastic films involved, will present like faces to each other in the overlap area being formed around the cable core, such faces then being capable of thermally bonding to each other in the jacket extrusion process of the cable assembly or by other suitable means thus providing a moisture-resistance seal around the cable core bundle.

Yet another advantage, by virtue of the double thickness provided by the above described foldover on the combined core wrap and shield combination, may provide a more rigid section at the sealing area of the core wrap which will, when pressure is exerted upon it in the jacket extrusion process, combine with the heat of extrusion to produce a more moisture-resistant bond between core wrap and the core bundle.

Yet a further advantage of this invention is, by means of the foldover described above, to ensure the maintenance of dielectric strength at the core wrap lap area, thus preventing "corona tracking" or surface creepage in the lap area.

Yet a further advantage is to fabricate a combined core wrap and shield in a manner which will permit substantially longer lengths to be produced than hitherto commercially available, such lengths reducing drastically the number of splices mentioned above, and in many cases permitting the production of commercial lengths of cable without a complete splice in the core wrap or the shield, thus reducing the posibility of cable failure at the splice point, by permitting the total length to be fabricated with uniform dielectric and physical properties as even the most carefully fabricated splice may not exhibit the integrity of section as the tape proper.

A still further advantage is to provide a device of the character herewithin described which may include leading and trailing ends of the combined core wrap and shield having a leading and trailing section of bare metallic foil, so that when splicing is necessary, this may be accomplished promptly and efficiently during the cable manufacturing process.

A yet further advantage is to provide a device of the character herewithin described which may include a combined core wrap and shield with quickly removable protective film over the leading and trailing ends of the bare metallic foil as described above, so the ends may be protected during storage against corrosion, but which may be readily exposed for the splicing process during cable manufacture in the clean state required for such splicing operations.

Yet another advantage is to provide a means whereby the longer lengths of combined core wrap and shield may be supplied on a supporting, transport, and payout structure which will present the substantially longer lengths of core wrap and shield to the cable making machinery in a manner designed to minimize handling and payout problems, and decrease the incidence of tape breakage or tangling during such payout operations.

Yet another advantage of this invention is to provide a device of the character herewithin described which may include a plastic face on the outermost side of the combined core wrap and shield, which by virtue of its properties may bond, or optionally not bond, to the jacket during the extrusion process, and which may optionally assist in the stripping of the cable jacket in the field.

A still further advantage is to provide a device of the character herewithin described which may include an optional metallic or non-metallic wire in the crease of the foldover area described above, which, at the option of the manufacturer of the cable, may be included in the combined core wrap and shield as a convenience in stripping the cable when such becomes necessary.

Yet a further advantage of the invention is to provide sealing on both faces and edges of the metallic foil, to render it substantially corrosion-proof and to maintain it in such a manner in service.

With the foregoing in view, and other advantages as will become apparent to those skilled in the art to which this invention relates as this specification proceeds, our invention consists essentially in the arrangement and construction of parts all as hereinafter more particularly described, reference being had to the accompanying drawings in which:

DESCRIPTION OF THE DRAWINGS

FIG. 1 is an enlarged cross section view of the multiple laminate combined core wrap and shield, in which the relative dimensions have been grossly exaggerated for clarity and including an exemplary description of the laminate.

FIG. 2 is an enlarged end view of a completed cable, with the combination core wrap and shield installed therein, again exaggerated dimensionally for purposes of clarity.

FIG. 3 is a plan view of one end of the combined core wrap and shield reduced in scale with relation to the other views.

FIG. 4 is an enlarged fragmentary view showing two sides of the combined core wrap and shield in a single overlapping relationship.

In the drawings like characters of reference indicate corresponding parts in the different figures.

DETAILED DESCRIPTION

Referring firstly to the cross section shown in FIG. 1, a metallic foil strip 12 is provided, manufactured usually of aluminum and acting as a shield, and in the range of 6 to 8 mils in thickness.

Although other arrangements of laminate may be used, as an example, upper or outer film 11 (with reference to FIG. 1) and which may be polyethylene terephthalate, polyvinyl chloride, polyethylene or any other suitable material, approximately 2 mils thick or as specified, is bonded to one side of foil shield 12 and extends over both longitudinal edges of the foil, meeting with lower film 13 which is bonded to the foil shield on the other side thereof, and on the extending edges, to film 11, on the one side by the juncture of adjacent surfaces 19. This lower film may be of polyester material or other suitable material approximately 1 mil thick or as specified. The bonding is preferably by means of adhesive or the like.

It will be seen that this construction completely envelops the foil strip 12 along both sides thereof in a corrosion-proof enclosure, providing adequate security against the entry of moisture.

In the preferred embodiment illustrated, below film 13, is film 14, of polyethylene material or other suitable material approximately 3 to 8 mils in thickness, which is bonded securely to film 13, and successively below the above described laminate, are bonded films 15 and 16 of approximately 1 mil polyester and approximately 2 mil polyethylene or any other suitable materials. Once again the bonding may be by heat sealing means or by adhesive means or any other type or method of bonding.

The triple laminate formed by films 13, 14 and 15 provides required dielectric strength and moisture resistance required to protect the core bundle, and the film 16 provides a thermoplastic layer, which when installed in the cable, makes firm contact upon itself and which, when thermally bonded, assists in the complete sealing of the core of the cable. It will be noted that all of the plastic films extend beyond the side edges of the metallic film strip 12.

Still referring to FIG. 1, in the process of manufacture of the invention, plastic films 11, 13, 14, 15 and 16 are simultaneously bonded in the flat configuration shown by the dotted lines 27, this edge having the longer of the extensions of the plastic laminate over foil strip 12. After the bonding process, this end or side edge 27 of the plastic laminate assembly is optionally folded back upon itself as shown in FIG. 1, so that contiguous surfaces 20 of film 11 may be brought into intimate contact and may be thermally bonded, if a thermoplastic film 11 is used, or may be left in physical contact only, if a thermosetting plastic such as polyethylene terephthalate is specified. The assembly in that case will be formed under heat and pressure and the combination of thermosetting and thermoplastic laminates adequately retains the optional foldover in position.

Optionally, during the foldover operation, wire or cord 17 may be inserted in the crease of the fold, to aid in stripping the cable assembly should this subsequently become necessary.

FIG. 2 shows a cross section of a representative cable assembly using the above described multiple laminated core wrap and shield assembly. A plurality of conductors 24 having been insulated and bundled in the conventional manner, are wrapped by the multiple laminated shield and core wrap collectively designated 22. This shield and core wrap is closely formed around the conductor and overlapped as shown in FIG. 2. Jacket 21 is then extruded around the core and shield assembly and the heat of extrusion bonds contiguous surfaces 23 to each other owing to their thermoplastic properties. This provides an effective hermetic seal at the point of overlap, and the greater thickness of the laminate at the point of overlap provides a superior basis for a uniform and effective bond between the mating surfaces.

It will be noted that, due to the materials chosen, films 13 and 15 are unaffected by the heat of the extrusion process, their dielectric properties remaining unaffected by the temperatures generated during such processes.

It will also be noted that the optional extension or foldover area 27 which can be varied in width to suit the specifications of the cable manufacturer, will, when bonded, provide an effective barrier against "trackage" of electrical current under dielectric test conditions or the effect of external electrical forces.

Alternatively, the extension portion 27 need not be folded over as shown in FIG. 1, but can be lapped over the other end 26 in the form of a simple lap joint, if desired, as shown in FIG. 4.

It will also become apparent that ends of the combination core wrap and shield can be stripped, by the removal of all plastic layers, leaving a section of clean metallic foil prepared for splicing if such an action is required. This feature shown in FIG. 3, on one end 28, may be incorporated in all reels or rolls of core wrap, and may be protected during shipment and handling by easily removable pressure sensitive protective tape 29 or the equivalent.

to accommodate the substantially longer lengths of core wrap which will be produced by this invention, the finished tape may be stored on reels by helical layer winding, which will result in less product damage in shipping, handling, storage, and on-line utilization.

It will therefore be seen that this unique contruction is capitalizing on the different properties, electrical and physical, of synthetic plastic films when such films of varied properties are applied to the metal foil shield 12 and bonded to each other in multiple laminated fashion.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A combination core wrap and shield for use in the manufacture of telecommunication cables and the like which cables include a core and an outer extruded plastic cable jacket; comprising in combination a flexible elongated shield of metallic foil having a pair of longitudinal edges, at least one outer flexible plastic film bonded to one side of said shield and also having longitudinal edges, the longitudinal edges of said outer plastic film extending beyond the longitudinal edges of said shield, at least one inner flexible plastic film bonded to the other side of said shield and also having longitudinally extending edges, the longitudinal extending edges of said inner plastic film also extending beyond the longitudinal extending edges of said shield, the portions of said inner and outer plastic films extending beyond the longitudinally extending edges of said shield, being bonded together to envelope said shield thus forming a corrosion and moisture-proof enclosure for said shield.

2. The invention according to claim 1 in which said inner and outer plastic films are compatible whereby said films will bond to one another by heat sealing when wrapped in overlapping relationship around the core of said cable.

3. The invention according to claim 1 in which said outer film is compatible with the material used for said cable jacket whereby said outer film will bond the interior of said cable jacket by heat sealing, when said cable jacket is installed upon said cable.

4. The invention according to claim 1 in which said shield extends beyond the ends of said inner and outer plastic films to facilitate splicing adjacent lengths of core wrap and shield together.

5. The invention according to claim 2 in which said shield extends beyond the ends of said inner and outer plastic films to facilitate splicing adjacent lengths of core wrap and shield together.

6. The invention according to claim 3 in which said shield extends beyond the ends of said inner and outer plastic films to facilitate splicing adjacent lengths of core wrap and shield together.

7. The invention according to claim 4 which includes detachable means over the extending ends of said shield to protect same against corrosion prior to said splicing of adjacent lengths of core wrap and shield together.

8. The invention according to claim 5 which includes detachable means over the extending ends of said shield to protect same against corrosion prior to said splicing of adjacent lengths of core wrap and shield together.

9. The invention according to claim 6 which includes detachable means over the extending ends of said shield to protect same against corrosion prior to said splicing of adjacent lengths of core wrap and shield together.

10. The invention according to claim 1 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

11. The invention according to claim 2 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

12. The invention according to claim 3 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

13. The invention according to claim 4 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

14. The invention according to claim 5 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

15. The invention according to claim 6 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

16. The invention according to claim 7 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

17. The invention according to claim 8 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

18. The invention according to claim 9 in which said inner film comprises a laminate, said laminate including a plurality of flexible films bonded together, at least one of said films having dielectric strength and moisture resisting properties, at least one layer of said laminate having longitudinally extending edges extending beyond the longitudinally extending edges of said shield, to bond to said outer film, said one of said films having dielectric strength, being heat resistant to preserve said dielectric strength property.

19. The invention according to claims 1, 2 or 3 in which the longitudinally extending edges of said inner and outer films extend beyond the longitudinal edges of said shield by a greater amount from one edge of said shield than from the other edge of said shield thereby providing a portion foldable back upon itself with the longitudinally extending fold being outboard of the longitudinal edge of said shield, and a flexible stripping member extending along the length of said fold.

20. The invention according to claims 4, 5 or 6 in which the longitudinally extending edges of said inner and outer films extend beyond the longitudinal edges of said shield by a greater amount from one edge of said shield than from the other edge of said shield thereby providing a portion foldable back upon itself with the longitudinally extending fold being outboard of the longitudinal edge of said shield, and a flexible stripping member extending along the length of said fold.

21. The invention according to claims 7, 8 or 9 in which the longitudinally extending edges of said inner and outer films extend beyond the longitudinal edges of said shield by a greater amount from one edge of said shield than from the other edge of said shield thereby providing a portion foldable back upon itself with the longitudinally extending fold being outboard of the longitudinal edge of said shield, and a flexible stripping member extending along the length of said fold.

22. The invention according to claims 10, 11 or 12 in which the longitudinally extending edges of said inner and outer films extend beyond the longitudinal edges of said shield by a greater amount from one edge of said shield than from the other edge of said shield thereby providing a portion foldable back upon itself with the longitudinally extending fold being outboard of the longitudinal edge of said shield, and a flexible stripping member extending along the length of said fold.

23. The invention according to claims 13, 14 or 15 in which the longitudinally extending edges of said inner and outer films extend beyond the longitudinal edges of said shield by a greater amount from one edge of said shield than from the other edge of said shield thereby providing a portion foldable back upon itself with the longitudinally extending fold being outboard of the longitudinal edge of said shield, and a flexible stripping member extending along the length of said fold.

24. The invention according to claims 16, 17 or 18 in which the longitudinally extending edges of said inner and outer films extend beyond the longitudinal edges of said shield by a greater amount from one edge of said shield than from the other edge of said shield thereby providing a portion foldable back upon itself with the longitudinally extending fold being outboard of the longitudinal edge of said shield, and a flexible stripping member extending along the length of said fold.

* * * * *